(12) United States Patent
Grab et al.

(10) Patent No.: US 10,917,449 B2
(45) Date of Patent: *Feb. 9, 2021

(54) SYSTEMS, METHODS, AND MEDIA FOR DELIVERY OF CONTENT

(71) Applicant: DIVX, LLC, San Diego, CA (US)

(72) Inventors: Eric W. Grab, San Diego, CA (US); Abhishek Shivadas, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/551,063

(22) Filed: Aug. 26, 2019

(65) Prior Publication Data

US 2020/0059505 A1 Feb. 20, 2020

Related U.S. Application Data

(63) Continuation of application No. 13/844,445, filed on Mar. 15, 2013.

(51) Int. Cl.
*H04L 29/06* (2006.01)
*H04L 29/08* (2006.01)
*G06Q 10/10* (2012.01)

(52) U.S. Cl.
CPC .......... *H04L 65/60* (2013.01); *H04L 65/4084* (2013.01); *H04L 65/605* (2013.01);
(Continued)

(58) Field of Classification Search
CPC ......... H04N 21/23439; H04N 21/4622; H04N 21/64738; H04N 21/23103;
(Continued)

(56) References Cited

U.S. PATENT DOCUMENTS 5,400,401 A 3/1995 Wasilewski et al.
5,574,785 A 11/1996 Ueno et al.
(Continued)

FOREIGN PATENT DOCUMENTS

CA 2237293 A1 7/1997
CN 110268694 A 9/2019
(Continued)

OTHER PUBLICATIONS

Extended European Search Report for European Application EP19189160.5, Report Completed Sep. 19, 2019, dated Sep. 26, 2019, 7 Pgs.

(Continued)

*Primary Examiner* — Kamal B Divecha
*Assistant Examiner* — Clifton Houston
(74) *Attorney, Agent, or Firm* — KPPB LLP

(57) ABSTRACT

Systems, methods, and computer readable media for delivery of content are provided. In some embodiments, systems for controlling delivery of content are provided, the systems comprising processing circuitry configured to: receive a request to stream the content, the request being received from a user equipment device; determine a first location of the user equipment device; determine a count of user equipment devices that are located at the first location and are currently streaming the content; determine whether the count meets a threshold; and responsive to determining that the count meets the threshold, add a first content delivery network to a pool of one or more content delivery networks that are used to stream the content.

17 Claims, 6 Drawing Sheets

(52) U.S. Cl.
CPC .......... *H04L 65/80* (2013.01); *H04L 67/2842* (2013.01); *G06Q 10/10* (2013.01); *H04L 67/1008* (2013.01)

(58) Field of Classification Search
CPC .......... H04N 21/23106; H04N 21/8456; H04L 67/1095; H04L 67/02; G06F 21/10
See application file for complete search history.

(56) References Cited

U.S. PATENT DOCUMENTS

| | | | |
|---|---|---|---|
| 5,600,721 | A | 2/1997 | Kitazato |
| 5,621,794 | A | 4/1997 | Matsuda et al. |
| 5,642,338 | A | 6/1997 | Fukushima et al. |
| 5,813,010 | A | 9/1998 | Kurano et al. |
| 5,854,873 | A | 12/1998 | Mori et al. |
| 5,907,658 | A | 5/1999 | Murase et al. |
| 5,923,869 | A | 7/1999 | Kashiwagi et al. |
| 6,002,834 | A | 12/1999 | Hirabayashi et al. |
| 6,009,237 | A | 12/1999 | Hirabayashi et al. |
| 6,016,381 | A | 1/2000 | Taira et al. |
| 6,057,832 | A | 5/2000 | Lev et al. |
| 6,266,483 | B1 | 7/2001 | Okada et al. |
| 6,282,320 | B1 | 8/2001 | Hasegawa et al. |
| 6,320,905 | B1 | 11/2001 | Konstantinides |
| 6,351,538 | B1 | 2/2002 | Uz |
| 6,373,803 | B2 | 4/2002 | Ando et al. |
| 6,415,031 | B1 | 7/2002 | Colligan et al. |
| 6,445,877 | B1 | 9/2002 | Okada et al. |
| 6,453,115 | B1 | 9/2002 | Boyle |
| 6,453,116 | B1 | 9/2002 | Ando et al. |
| 6,504,873 | B1 | 1/2003 | Vehvilaeinen |
| 6,512,883 | B2 | 1/2003 | Shim et al. |
| 6,594,699 | B1 | 7/2003 | Sahai et al. |
| 6,654,933 | B1 | 11/2003 | Abbott et al. |
| 6,690,838 | B2 | 2/2004 | Zhou |
| 6,724,944 | B1 | 4/2004 | Kalevo et al. |
| 6,751,623 | B1 | 6/2004 | Basso et al. |
| 6,813,437 | B2 | 11/2004 | Ando et al. |
| 6,871,006 | B1 | 3/2005 | Oguz et al. |
| 6,912,513 | B1 | 6/2005 | Candelore |
| 6,931,531 | B1 | 8/2005 | Takahashi |
| 6,957,350 | B1 | 10/2005 | Demos |
| 6,970,564 | B1 | 11/2005 | Kubota et al. |
| 6,983,079 | B2 | 1/2006 | Kim |
| 7,006,757 | B2 | 2/2006 | Ando et al. |
| 7,020,287 | B2 | 3/2006 | Unger |
| 7,188,183 | B1 | 3/2007 | Paul et al. |
| 7,212,726 | B2 | 5/2007 | Zetts |
| 7,274,861 | B2 | 9/2007 | Yahata et al. |
| 7,295,673 | B2 | 11/2007 | Grab et al. |
| 7,352,956 | B1 | 4/2008 | Winter et al. |
| 7,382,879 | B1 | 6/2008 | Miller |
| 7,397,853 | B2 | 7/2008 | Kwon et al. |
| 7,400,679 | B2 | 7/2008 | Kwon et al. |
| 7,418,132 | B2 | 8/2008 | Hoshuyama |
| 7,457,415 | B2 | 11/2008 | Reitmeier et al. |
| 7,499,930 | B2 | 3/2009 | Naka et al. |
| 7,546,641 | B2 | 6/2009 | Robert et al. |
| 7,639,921 | B2 | 12/2009 | Seo et al. |
| 7,711,052 | B2 | 5/2010 | Hannuksela et al. |
| 7,853,980 | B2 | 12/2010 | Pedlow, Jr. et al. |
| 7,864,186 | B2 | 1/2011 | Robotham et al. |
| 7,945,143 | B2 | 5/2011 | Yahata et al. |
| 8,131,875 | B1 | 3/2012 | Chen |
| 8,169,916 | B1 | 5/2012 | Pai et al. |
| 8,243,924 | B2 | 8/2012 | Chen et al. |
| 8,286,213 | B2 | 10/2012 | Seo |
| 8,312,079 | B2 | 11/2012 | Newsome et al. |
| 8,369,421 | B2 | 2/2013 | Kadono et al. |
| 8,595,378 | B1 * | 11/2013 | Cohn ..................... G06F 9/455 709/238 |
| 8,649,669 | B2 | 2/2014 | Braness et al. |
| 8,683,066 | B2 | 3/2014 | Hurst et al. |
| 8,782,268 | B2 | 7/2014 | Pyle et al. |
| 8,819,116 | B1 | 8/2014 | Tomay et al. |
| 8,849,950 | B2 | 9/2014 | Stockhammer et al. |
| 9,038,116 | B1 | 5/2015 | Knox et al. |
| 9,391,866 | B1 | 7/2016 | Martin et al. |
| 9,509,742 | B2 | 11/2016 | Gordon |
| 10,397,292 | B2 | 8/2019 | Grab et al. |
| 10,498,795 | B2 | 12/2019 | Srinivasan et al. |
| 2001/0021276 | A1 | 9/2001 | Zhou |
| 2001/0052077 | A1 | 12/2001 | Fung et al. |
| 2001/0052127 | A1 | 12/2001 | Seo et al. |
| 2002/0048450 | A1 | 4/2002 | Zetts |
| 2002/0067432 | A1 | 6/2002 | Kondo et al. |
| 2002/0116481 | A1 * | 8/2002 | Lee ..................... H04L 67/2842 709/220 |
| 2002/0135607 | A1 | 9/2002 | Kato et al. |
| 2002/0141503 | A1 | 10/2002 | Kobayashi et al. |
| 2002/0154779 | A1 | 10/2002 | Asano et al. |
| 2002/0164024 | A1 | 11/2002 | Arakawa et al. |
| 2002/0169971 | A1 | 11/2002 | Asano et al. |
| 2003/0002577 | A1 | 1/2003 | Pinder |
| 2003/0044080 | A1 | 3/2003 | Frishman et al. |
| 2003/0053541 | A1 | 3/2003 | Sun et al. |
| 2003/0063675 | A1 | 4/2003 | Kang et al. |
| 2003/0077071 | A1 | 4/2003 | Lin et al. |
| 2003/0135742 | A1 | 7/2003 | Evans |
| 2003/0142594 | A1 | 7/2003 | Tsumagari et al. |
| 2003/0206717 | A1 | 11/2003 | Yogeshwar et al. |
| 2004/0001594 | A1 | 1/2004 | Krishnaswamy et al. |
| 2004/0022391 | A1 | 2/2004 | Obrien |
| 2004/0028227 | A1 | 2/2004 | Yu |
| 2004/0037421 | A1 | 2/2004 | Truman |
| 2004/0047592 | A1 | 3/2004 | Seo et al. |
| 2004/0047607 | A1 | 3/2004 | Seo et al. |
| 2004/0076237 | A1 | 4/2004 | Kadono et al. |
| 2004/0088412 | A1 * | 5/2004 | John ..................... H04L 29/06 709/226 |
| 2004/0093494 | A1 | 5/2004 | Nishimoto et al. |
| 2004/0101059 | A1 | 5/2004 | Joch et al. |
| 2004/0107356 | A1 | 6/2004 | Shamoon et al. |
| 2005/0013494 | A1 | 1/2005 | Srinivasan et al. |
| 2005/0063541 | A1 | 3/2005 | Candelore |
| 2005/0076232 | A1 | 4/2005 | Kawaguchi |
| 2005/0144468 | A1 | 6/2005 | Northcutt |
| 2005/0177741 | A1 | 8/2005 | Chen et al. |
| 2005/0243912 | A1 | 11/2005 | Kwon et al. |
| 2005/0265555 | A1 | 12/2005 | Pippuri |
| 2006/0013568 | A1 | 1/2006 | Rodriguez |
| 2006/0156330 | A1 * | 7/2006 | Chiu ..................... H04N 21/4782 725/24 |
| 2006/0165163 | A1 | 7/2006 | Burazerovic et al. |
| 2007/0047645 | A1 | 3/2007 | Takashima |
| 2007/0067472 | A1 | 3/2007 | Maertens et al. |
| 2007/0083467 | A1 | 4/2007 | Lindahl et al. |
| 2007/0180051 | A1 | 8/2007 | Kelly et al. |
| 2007/0271385 | A1 * | 11/2007 | Davis ..................... H04L 67/142 709/228 |
| 2008/0086570 | A1 | 4/2008 | Dey et al. |
| 2008/0101718 | A1 | 5/2008 | Yang et al. |
| 2008/0114891 | A1 * | 5/2008 | Pereira ................. H04L 12/1854 709/231 |
| 2008/0137847 | A1 | 6/2008 | Candelore et al. |
| 2009/0010622 | A1 | 1/2009 | Yahata et al. |
| 2009/0013195 | A1 | 1/2009 | Ochi et al. |
| 2009/0077143 | A1 | 3/2009 | Macy, Jr. |
| 2009/0106082 | A1 | 4/2009 | Senti et al. |
| 2009/0249081 | A1 | 10/2009 | Zayas |
| 2009/0282162 | A1 | 11/2009 | Mehrotra et al. |
| 2009/0310819 | A1 | 12/2009 | Hatano |
| 2010/0142915 | A1 | 6/2010 | Mcdermott et al. |
| 2010/0332595 | A1 * | 12/2010 | Fullagar ........... H04N 21/23103 709/203 |
| 2011/0010466 | A1 | 1/2011 | Fan et al. |
| 2011/0016225 | A1 * | 1/2011 | Park ..................... H04N 21/4392 709/234 |
| 2011/0058675 | A1 | 3/2011 | Brueck et al. |
| 2011/0103374 | A1 | 5/2011 | Lajoie et al. |
| 2011/0145858 | A1 | 6/2011 | Philpott et al. |

(56) References Cited

U.S. PATENT DOCUMENTS

| | | | |
|---|---|---|---|
| 2011/0153835 A1* | 6/2011 | Rimac | H04L 67/1051 709/227 |
| 2011/0173345 A1 | 7/2011 | Knox et al. | |
| 2011/0179185 A1 | 7/2011 | Wang et al. | |
| 2011/0191439 A1* | 8/2011 | Dazzi | G06F 15/16 709/217 |
| 2011/0197238 A1* | 8/2011 | Li | H04N 21/8456 725/93 |
| 2011/0197261 A1 | 8/2011 | Dong et al. | |
| 2011/0225302 A1* | 9/2011 | Park | H04L 69/14 709/227 |
| 2011/0246661 A1 | 10/2011 | Manzari et al. | |
| 2011/0296048 A1 | 12/2011 | Knox et al. | |
| 2011/0314130 A1 | 12/2011 | Strasman | |
| 2012/0005312 A1 | 1/2012 | Mcgowan et al. | |
| 2012/0042090 A1 | 2/2012 | Chen et al. | |
| 2012/0047542 A1 | 2/2012 | Lewis et al. | |
| 2012/0066360 A1* | 3/2012 | Ghosh | H04L 43/0864 709/223 |
| 2012/0110120 A1 | 5/2012 | Willig et al. | |
| 2012/0124191 A1* | 5/2012 | Lyon | H04L 67/1008 709/223 |
| 2012/0166633 A1* | 6/2012 | Baumback | H04L 43/0811 709/224 |
| 2012/0167132 A1 | 6/2012 | Mathews et al. | |
| 2012/0240176 A1* | 9/2012 | Ma | H04L 67/1095 725/114 |
| 2012/0297039 A1* | 11/2012 | Acuna | H04L 67/1097 709/223 |
| 2012/0311174 A1 | 12/2012 | Bichot et al. | |
| 2012/0317235 A1* | 12/2012 | Nguyen | H04N 21/6375 709/219 |
| 2012/0331167 A1 | 12/2012 | Hunt | |
| 2013/0013730 A1* | 1/2013 | Li | H04L 61/1511 709/217 |
| 2013/0013803 A1 | 1/2013 | Bichot et al. | |
| 2013/0080267 A1 | 3/2013 | McGowan | |
| 2013/0212228 A1* | 8/2013 | Butler | G06T 11/60 709/219 |
| 2013/0301424 A1* | 11/2013 | Kotecha | H04L 65/602 370/242 |
| 2014/0047069 A1* | 2/2014 | Ma | H04N 21/4622 709/218 |
| 2014/0140253 A1 | 5/2014 | Lohmar et al. | |
| 2014/0143301 A1* | 5/2014 | Watson | H04L 69/14 709/203 |
| 2014/0143431 A1* | 5/2014 | Watson | H04L 65/4084 709/227 |
| 2014/0149557 A1 | 5/2014 | Lohmar et al. | |
| 2014/0164584 A1* | 6/2014 | Joe | H04L 61/1511 709/223 |
| 2014/0280763 A1 | 9/2014 | Grab et al. | |
| 2015/0067715 A1* | 3/2015 | Koat | H04H 60/15 725/25 |
| 2015/0288530 A1 | 10/2015 | Oyman | |
| 2016/0234069 A1 | 8/2016 | Coudurier et al. | |
| 2018/0241796 A1 | 8/2018 | Srinivasan et al. | |
| 2020/0068004 A1 | 2/2020 | Srinivasan et al. | |

FOREIGN PATENT DOCUMENTS

| | | |
|---|---|---|
| EP | 1453319 A1 | 9/2004 |
| EP | 1283640 B1 | 10/2006 |
| EP | 2180664 A1 | 4/2010 |
| EP | 2360923 A1 | 8/2011 |
| EP | 2486517 A1 | 8/2012 |
| EP | 2486727 A4 | 3/2014 |
| EP | 2564354 A4 | 3/2014 |
| EP | 2616991 A4 | 3/2014 |
| EP | 2617192 A4 | 3/2014 |
| EP | 2751990 A4 | 4/2015 |
| EP | 2972960 B1 | 9/2019 |
| EP | 3583760 A1 | 12/2019 |
| EP | 3598316 A1 | 1/2020 |
| HK | 40010448 A | 7/2020 |
| HK | 40012266 A | 7/2020 |
| JP | 2002170363 A | 6/2002 |
| JP | 2020511811 A | 4/2020 |
| KR | 20040039852 A | 5/2004 |
| KR | 20060106250 A | 10/2006 |
| RU | 2328040 C2 | 6/2008 |
| WO | 2000049762 A2 | 8/2000 |
| WO | 2000049763 A1 | 8/2000 |
| WO | 2003047262 A2 | 6/2003 |
| WO | 2004012378 A2 | 2/2004 |
| WO | 2004100158 A1 | 11/2004 |
| WO | 2005008385 A2 | 1/2005 |
| WO | 2005015935 A1 | 2/2005 |
| WO | 2007113836 B1 | 12/2008 |
| WO | 2009006302 A1 | 1/2009 |
| WO | 2009109976 A2 | 9/2009 |
| WO | 2011087449 A1 | 7/2011 |
| WO | 2011101371 A1 | 8/2011 |
| WO | 2013111126 A3 | 6/2015 |

OTHER PUBLICATIONS

International Preliminary Report on Patentability for International Application No. PCT/US2008/083816, dated May 18, 2010, 6 pgs.

International Preliminary Report on Patentability for International Application PCT/US2018/018399, Report dated Aug. 20, 2019, dated Aug. 29, 2019, 7 Pgs.

Office Action for Chinese Patent Application No. CN200880127596.4, dated May 6, 2014, 15 pgs.

Written Opinion for International Application No. PCT/US2007/063950, report completed Mar. 1, 2008, report dated Mar. 19, 2008, 6 pgs.

Invitation to Pay Additional Fees for International Application PCT/US2014/039852, dated Sep. 25, 2014, 2 Pgs.

"DVD-MPEG differences", printed Jul. 2, 2009 from http://dvd.sourceforge.net/dvdinfo/dvdmpeg.html, 1 pg.

"OpenDML AVI File Format Extensions Version 1.02", OpenDMLAVI MJPEG File Format Subcommittee. Last revision: Feb. 28, 1996. Reformatting: Sep. 1997, 56 pgs.

"Smooth Streaming Client", The Official Microsoft IIS Site, Sep. 24, 2010, 4 pages.

"Supplementary European Search Report for Application No. EP 10834935, Search Completed May 27, 2014, 9 pgs."

"Text of ISO/IEC 14496-18/COR1, Font compression and streaming", ITU Study Group 16—Video Coding Experts Group—ISO/IEC MPEG & ITU-T VCEG(ISO/IEC JTC1/SC29/WG11 and ITU-T SG16 06), No. N8664, Oct. 27, 2006, 8 pgs.

U.S. Appl. No. 13/905,804, "Non-Final Office Action Received", dated Jul. 25, 2014, 15 pgs.

Nelson, Mark, "Arithmetic Coding + Statistical Modeling = Data Compression: Part 1—Arithmetic Coding", Doctor Dobb's Journal, Feb. 1991, printed from http://www.dogma.net/markn/articles/arith/part1.htm; printed Jul. 2, 2003, 12 pgs.

Unknown, "MPEG-4 Video Encoder: Based on International Standard ISO/IEC 14496-2", Patni Computer Systems, Ltd., publication date unknown, 15 pgs.

Information Technology—MPEG Systems Technologies—Part 7: Common Encryption in ISO Base Media File Format Files (ISO/IEC 23001-7), Apr. 2015, 24 pgs.

ISO/IEC 14496-12 Information technology—Coding of audio-visual objects—Part 12: ISO base media file format, Feb. 2004 ("MPEG-4 Part 12 Standard"), 62 pgs.

ISO/IEC 14496-12:2008(E) Informational Technology—Coding of Audio-Visual Objects Part 12: ISO Base Media File Format, Oct. 2008, 120 pgs.

ISO/IEC FCD 23001-6 MPEG systems technologies Part 6: Dynamic adaptive streaming over HTTP (DASH), Jan. 28, 2011, 86 pgs.

Microsoft Corporation, Advanced Systems Format (ASF) Specification, Revision Jan. 20, 2003, Dec. 2004, 121 pgs.

MPEG-DASH presentation at Streaming Media West 2011, Nov. 2011, 14 pgs.

(56) References Cited

OTHER PUBLICATIONS

Pomelo, LLC Tech Memo, Analysis of Netflix's Security Framework for 'Watch Instantly' Service, Mar.-Apr. 2009, 18 pgs.
Server-Side Stream Repackaging (Streaming Video Technologies Panorama, Part 2), Jul. 2011, 15 pgs.
Text of ISO/IEC 23001-6: Dynamic adaptive streaming over HTTP (DASH), Oct. 2010, 71 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
"Apple HTTP Live Streaming specification", Aug. 2017, 60 pgs.
"Data Encryption Decryption using AES Algorithm, Key and Salt with Java Cryptography Extension", Available at https://www.digizol.com/2009/10/java-encrypt-decrypt-jce-salt.html, Oct. 200, 6 pgs.
"Delivering Live and On-Demand Smooth Streaming", Microsoft Silverlight, 2009, 28 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"Live and On-Demand Video with Silverlight and IIS Smooth Streaming", Microsoft Silverlight, Windows Server Internet Information Services 7.0, Feb. 2010, 15 pgs.
"Microsoft Smooth Streaming specification", Jul. 22, 2013, 56 pgs.
"Single-Encode Streaming for Multiple Screen Delivery", Telestream Wowza Media Systems, 2009, 6 pgs.
"The MPEG-DASH Standard for Multimedia Streaming Over the Internet", IEEE MultiMedia, vol. 18, No. 4, 2011, 7 pgs.
"Windows Media Player 9", Microsoft, Mar. 23, 2017, 3 pgs.
Abomhara et al., "Enhancing Selective Encryption for H.264/AVC Using Advanced Encryption Standard", International Journal of computer Theory and Engineering, Apr. 2010, vol. 2, No. 2, pp. 223-229.
Timmerer et al., "HTTP Streaming of MPEG Media", Proceedings of Streaming Day, 2010, 4 pgs.
Tiphaigne et al., "A Video Package for Torch", Jun. 2004, 46 pgs.
Trappe et al., "Key Management and Distribution for Secure Multimedia Multicast", IEEE Transaction on Multimedia, vol. 5, No. 4, Dec. 2003, pp. 544-557.
Van Deursen et al., "On Media Delivery Protocols in the Web", 2010 IEEE International Conference on Multimedia and Expo, Jul. 19-23, 2010, 6 pgs.
Ventura, "Streaming of Multimedia Learning Objects", AG Integrated Communication System, Mar. 2003, 101 pgs.
Waggoner, "Compression for Great Digital Video", 2002, 184 pgs.
Watanabem et al., "MPEG-2 decoder enables DTV trick plays", esearcher System LSI Development Lab, Fujitsu Laboratories Ltd., Kawasaki, Japan, Jun. 2001, 2 pgs.
Wiegand, "Joint Video Team (JVT) of ISO/IEC MPEG and ITU-T VCEG", Jan. 2002, 70 pgs.
Willig et al., U.S. Appl. No. 61/409,285, filed Nov. 2, 2010, 43 pgs.
Yang et al., "Projection-Based Spatially Adaptive Reconstruction of Block-Transform Compressed Images", IEEE Transactions on Image Processing, vol. 4, No. 7, Jul. 1995, pp. 896-908.
Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.
Yu et al., "Video deblocking with fine-grained scalable complexity for embedded mobile computing", Proceedings 7th International Conference on Signal Processing, Aug. 31-Sep. 4, 2004, pp. 1173-1178.
Zakhor, "Iterative Procedures for Reduction of Blocking Effects in Transform Image Coding", IEEE Transactions on Circuits and Systems for Video Technology, vol. 2, No. 1, Mar. 1992, pp. 91-95.
Alattar et al., "Improved selective encryption techniques for secure transmission of MPEG video bit-streams", In Proceedings 1999 International Conference on Image Processing (Cat. 99CH36348), vol. 4, IEEE, 1999, pp. 256-260.
Antoniou et al., "Adaptive Methods for the Transmission of Video Streams in Wireless Networks", 2015, 50 pgs.
Apostolopoulos et al., "Secure Media Streaming and Secure Transcoding", Multimedia Security Technologies for Digital Rights Management, 2006, 33 pgs.
Asai et al., "Essential Factors for Full-Interactive VOD Server: Video File System, Disk Scheduling, Network", Proceedings of Globecom '95, Nov. 14-16, 1995, 6 pgs.
Beker et al., "Cipher Systems, The Protection of Communications", 1982, 40 pgs.
Bocharov et al., "Portable Encoding of Audio-Video Objects, The Protected Interoperable File Format (PIFF)", Microsoft Corporation, First Edition Sep. 8, 2009, 30 pgs.
Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).
Cahill et al., "Locally Adaptive Deblocking Filter for Low Bit Rate Video", Proceedings 2000 International Conference on Image Processing, Sep. 10-13, 2000, Vancouver, BC, Canada, 4 pgs.
Candelore, U.S. Appl. No. 60/372,901, filed Apr. 17, 2002, 5 pgs.
Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", Thesis, Fall 1998, 95 pgs.
Cheng et al., "Partial encryption of compressed images and videos", IEEE Transactions on Signal Processing, vol. 48, No. 8, Aug. 2000, 13 pgs.
Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.
Collet, "Delivering Protected Content, An Approach for Next Generation Mobile Technologies", Thesis, 2010, 84 pgs.
Diamantis et al., "Real Time Video Distribution using Publication through a Database", Proceedings SIBGRAPI'98. International Symposium on Computer Graphics, Image Processing, and Vision (Cat. No. 98EX237), Oct. 1990, 8 pgs.
Dworkin, "Recommendation for Block Cipher Modes of Operation: Methods and Techniques", NIST Special Publication 800-38A, 2001, 66 pgs.
Fang et al., "Real-time deblocking filter for MPEG-4 systems", Asia-Pacific Conference on Circuits and Systems, Oct. 28-31, 2002, Bail, Indonesia, 4 pgs.
Fecheyr-Lippens, "A Review of HTTP Live Streaming", Jan. 2010, 38 pgs.
Fielding et al., "Hypertext Transfer Protocol—HTTP1.1", Network Working Group, RFC 2616, Jun. 1999, 114 pgs.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, 4 pgs.
Huang, U.S. Pat. No. 7,729,426, U.S. Appl. No. 11/230,794, filed Sep. 20, 2005, 143 pgs.
Huang et al., "Adaptive MLP post-processing for block-based coded images", IEEE Proceedings—Vision, Image and Signal Processing, vol. 147, No. 5, Oct. 2000, pp. 463-473.
Huang et al., "Architecture Design for Deblocking Filter in H.264/JVT/AVC", 2003 International Conference on Multimedia and Expo., Jul. 6-9, 2003, Baltimore, MD, 4 pgs.

(56) References Cited

OTHER PUBLICATIONS

Jain et al., U.S. Appl. No. 61/522,623, filed Aug. 11, 2011, 44 pgs.
Jung et al., "Design and Implementation of an Enhanced Personal Video Recorder for DTV", IEEE Transactions on Consumer Electronics, vol. 47, No. 4, Nov. 2001, 6 pgs.
Kalva, Hari, "Delivering MPEG-4 Based Audio-Visual Services", 2001, 113 pgs.
Kang et al., "Access Emulation and Buffering Techniques for Steaming of Non-Stream Format Video Files", IEEE Transactions on Consumer Electronics, vol. 43, No. 3, Aug. 2001, 7 pgs.
Kim et al., "A Deblocking Filter with Two Separate Modes in Block-based Video Coding", IEEE transactions on circuits and systems for video technology, vol. 9, No. 1, 1999, pp. 156-160.
Kim et al., "Tree-Based Group Key Agreement", Feb. 2004, 37 pgs.
Laukens, "Adaptive Streaming—A Brief Tutorial", EBU Technical Review, 2011, 6 pgs.
Legault et al., "Professional Video Under 32-bit Windows Operating Systems", Smpte Journal, vol. 105, No. 12, Dec. 1996, 8 pgs.
Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.
List et al., "Adaptive deblocking filter", IEEE transactions on circuits and systems for video technology, vol. 13, No. 7, Jul. 2003, pp. 614-619.
Massoudi et al., "Overview on Selective Encryption of Image and Video: Challenges and Perspectives", EURASIP Journal on Information Security, Nov. 2008, 18 pgs.
McCanne et al., "Receiver-driven Layered Multicast", Conference proceedings on Applications, technologies, architectures, and protocols for computer communications, Aug. 1996, 14 pgs.
Meier, "Reduction of Blocking Artifacts in Image and Video Coding", IEEE Transactions on Circuits and Systems for Video Technology, vol. 9, No. 3, Apr. 1999, pp. 490-500.
Newton et al., "Preserving Privacy by De-identifying Facial Images", Carnegie Mellon University School of Computer Science, Technical Report, CMU-CS-03119, Mar. 2003, 26 pgs.
O'Brien, File Wrapper, U.S. Appl. No. 60/399,846, filed Jul. 30, 2002, 27 pgs.
O'Rourke, "Improved Image Decompression for Reduced Transform Coding Artifacts", IEEE Transactions on Circuits and Systems for Video Technology, vol. 5, No. 6, Dec. 1995, pp. 490-499.
Park et al., "A postprocessing method for reducing quantization effects in low bit-rate moving picture coding", IEEE Transactions on Circuits and Systems for Video Technology, vol. 9, No. 1, Feb. 1999, pp. 161-171.
Richardson, "H.264 and MPEG-4 Video Compression", Wley, 2003, 306 pgs. (presented in 2 parts).
Sima et al., "An Efficient Architecture for Adaptive Deblocking Filter of H.264 AVC Video Coding", IEEE Transactions on Consumer Electronics, vol. 50, No. 1, Feb. 2004, pp. 292-296.
Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.
Srinivasan et al., "Windows Media Video 9: overview and applications", Signal Processing: Image Communication, 2004, 25 pgs.
Stockhammer, "Dynamic Adaptive Streaming over HTTP—Standards and Design Principles", Proceedings of the second annual ACM conference on Multimedia, Feb. 2011, pp. 133-145.
Extended European Search Report for European Application No. 18754078.6, Search completed Sep. 14, 2020, dated Sep. 24, 2020, 12 Pgs.
Van Brandenburg et al., "Models for HTTP-Adaptive-Streaming-Aware Content Distribution Network Interconnection (CDNI)", RFC6983.TXT, Internet Engineering Task Force, IETF; Standard, Internet Society (ISOC) 4, Rue Des Falaises Ch-1205 Geneva, Switzerland, Jul. 24, 2013 (Jul. 24, 2013), pp. 1-45.

\* cited by examiner

SYSTEMS, METHODS, AND MEDIA FOR DELIVERY OF CONTENT

CROSS REFERENCE TO RELATED APPLICATIONS

The current application is a continuation of U.S. patent application Ser. No. 13/844,445, filed Mar. 15, 2013, entitled "Systems, Methods, and Media for Delivery of Content" to Grab et al., the disclosure of which is incorporated herein by reference in its entirety.

BACKGROUND OF THE INVENTION

Consumers increasingly have the option to stream live media content over the Internet. When content is streamed live, fragments of the content are provided to user equipment devices as the content is being created. These fragments are rendered by the user equipment devices as they arrive, permitting consumers to observe events, such as sports games, as the events develop. Live Internet streaming may be advantageous because it may give consumers access to kinds of programming that were until recently strictly in the domain of traditional television and radio broadcasting.

Streaming of live media content may be more technically challenging than non-live content streaming. Because live content is rendered at approximately the same time as it is captured, live content cannot be buffered for prolonged periods of time. The lack of extensive buffering in live content streaming may cause live content streaming to require greater network bandwidth and/or smaller network latency than non-live content streaming.

Accordingly, the need exists for new methods, systems, and media for delivery of content that are capable of satisfying the bandwidth and latency requirements of live content streaming while still being suitable for streaming non-live content.

SUMMARY OF THE INVENTION

Systems, methods, and media for delivery of content are provided. In some embodiments, systems for controlling delivery of content are provided, the systems comprising processing circuitry configured to: receive a request to stream the content, the request being received from a user equipment device; determine a first location of the user equipment device; determine a count of user equipment devices that are located at the first location and are currently streaming the content; determine whether the count meets a threshold; and responsive to determining that the count meets the threshold, add a first content delivery network to a pool of one or more content delivery networks that are used to stream the content.

In some embodiments, methods for delivery of content are provided, the methods comprising: receiving a request to stream the content, the request being received from a user equipment device; determining a first location of the user equipment device; determining a count of user equipment devices that are located at the first location and are currently streaming the content; determining whether the count meets a threshold; and responsive to determining that the count meets the threshold, adding, by processing circuitry, a first content delivery network to a pool of one or more content delivery networks that are used to stream the content.

In some embodiments, non-transitory computer-readable media that contain computer-executable instructions which, when executed by a processor, cause the processor to perform a method for delivery of content are provided, the method comprising: receiving a request to stream the content, the request being received from a user equipment device; determining a first location of the user equipment device; determining a count of user equipment devices that are located at the first location and are currently streaming the content; determining whether the count meets a threshold; and responsive to determining that the count meets the threshold, adding a first content delivery network to a pool of one or more content delivery networks that are used to stream the content.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF EMBODIMENTS

This invention generally relates to systems, methods, and media for controlling delivery of content. In some embodiments, mechanisms (which can be systems, methods, media, etc.) are provided for controlling the distribution of media content that is delivered to user equipment devices by a pool of one or more content distribution networks (CDNs). In some embodiments, a count of user equipment devices that are streaming content from a particular location can be monitored and, when the count exceeds a predetermined threshold, a new content distribution network can be added to the pool.

As referred to herein, the term "media content" or "content" should be understood to mean one or more electronically consumable media assets, such as television programs, pay-per-view programs, on-demand programs (e.g., as provided in video-on-demand (VOD) systems), Internet content (e.g., streaming content, downloadable content, Webcasts, etc.), movies, films, video clips, audio, audio books, and/or any other media or multimedia and/or combination of the same. As referred to herein, the term "multimedia" should be understood to mean media content that utilizes at least two different content forms described above, for example, text, audio, images, video, or interactivity content forms. Media content may be recorded, played, displayed or accessed by user equipment devices, but can also be part of a live performance. In some embodiments, media content can include over-the-top (OTT) content. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC.

Media content can be provided from any suitable source in some embodiments. In some embodiments, media content can be electronically delivered to a user's location from a remote location. For example, media content, such as a Video-On-Demand movie, can be delivered to a user's home from a cable system server. As another example, media content, such as a television program, can be delivered to a user's home from a streaming media provider over the Internet.

Figure 1:
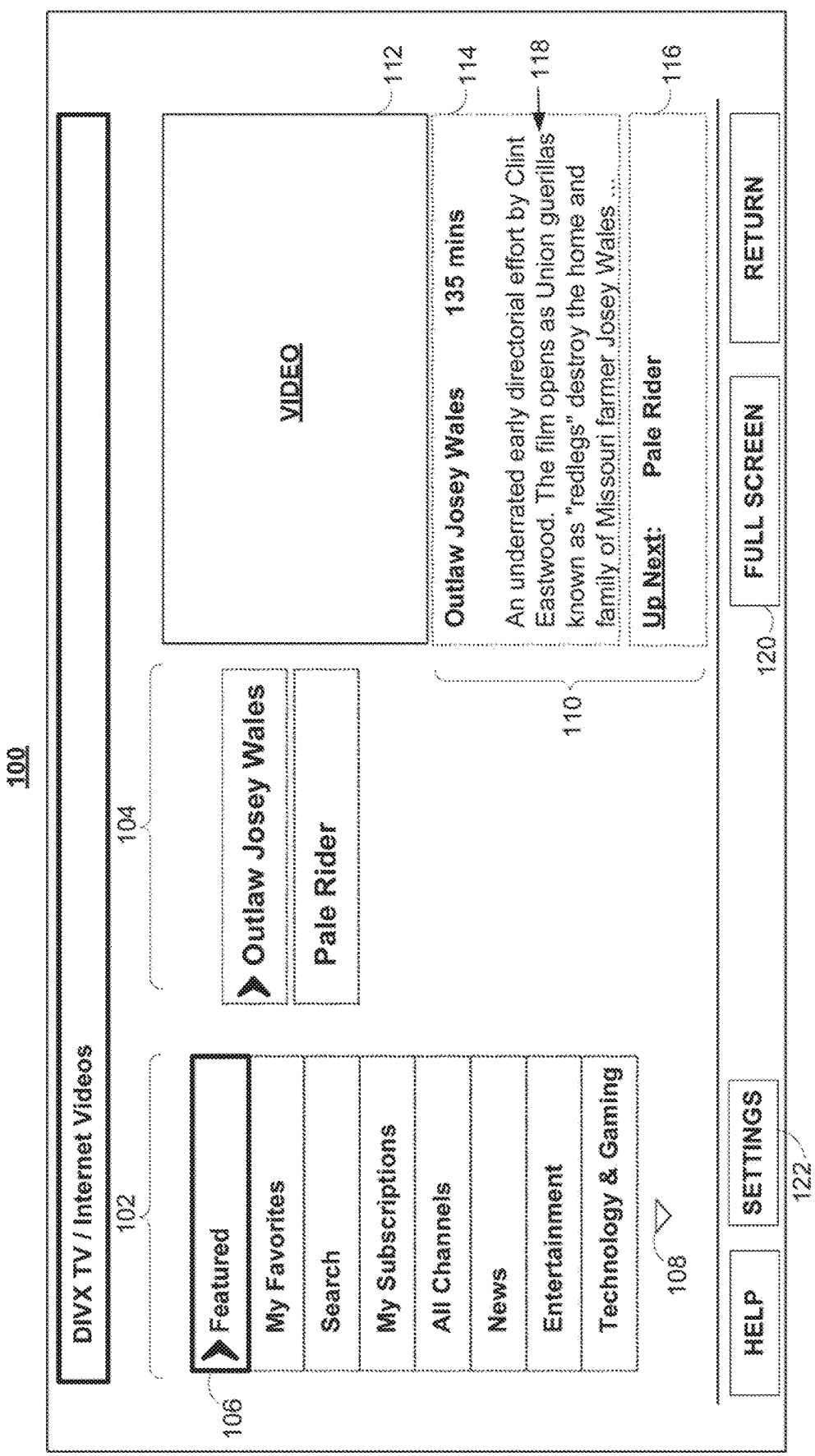
FIG. 1 shows an example of an interactive media guidance application display that can be used with a process for selecting media content for presentation in accordance with some embodiments of the invention.

FIG. 1 shows an example 100 of a guidance display that can be provided as part of an interactive media guidance application in accordance with some embodiments. As illustrated, a user may be presented with display 100 in response to the user selecting a selectable option provided in a displayed menu (e.g., an "Internet Videos" option, a "DivXTV" option, a "Program Listings" option, etc.), pressing a dedicated button (e.g., a GUIDE button) on a user input interface or device, and/or taking any other suitable action.

As illustrated in FIG. 1, guidance display 100 may include lists of media identifiers, such as a first list of media identifiers 102 that lists categories of media content, and a second list of media identifiers 104 that lists particular pieces of media content within a selected category that are available for presentation.

Additional media guidance data, such as additional media identifiers, may be presented in response to a user selecting a navigational icon 108.

Display 100 may also include a media queue region 110 that lists one or more pieces of media content selected and queued for playback, and a video region 112 in which pieces of media content can be presented.

In some embodiments, information relating to a piece of media content can also be presented to a user. For example, information 118 can include a name of a piece of media content, a time at which the media content is available (if applicable), a source (e.g., channel, Web address, etc.) from which the media content can be obtained, a parental rating for the piece of media content, a duration of the piece of media content, a description of the piece of media content, a review or a quality rating of the piece of media content, and/or any other suitable information.

In some embodiments, pieces of media content can be played in a full sized display screen in response to a user selecting "full screen" button 120.

In some embodiments, a user may be able to set settings related to the interactive media guidance application by pressing a settings button, such as settings button 122 of FIG. 1. The settings that can be set can include any suitable settings such as channel and program favorites, programming preferences that the guidance application can utilize to make programming recommendations, display preferences, language preferences, and/or any other suitable settings.

Figure 2:
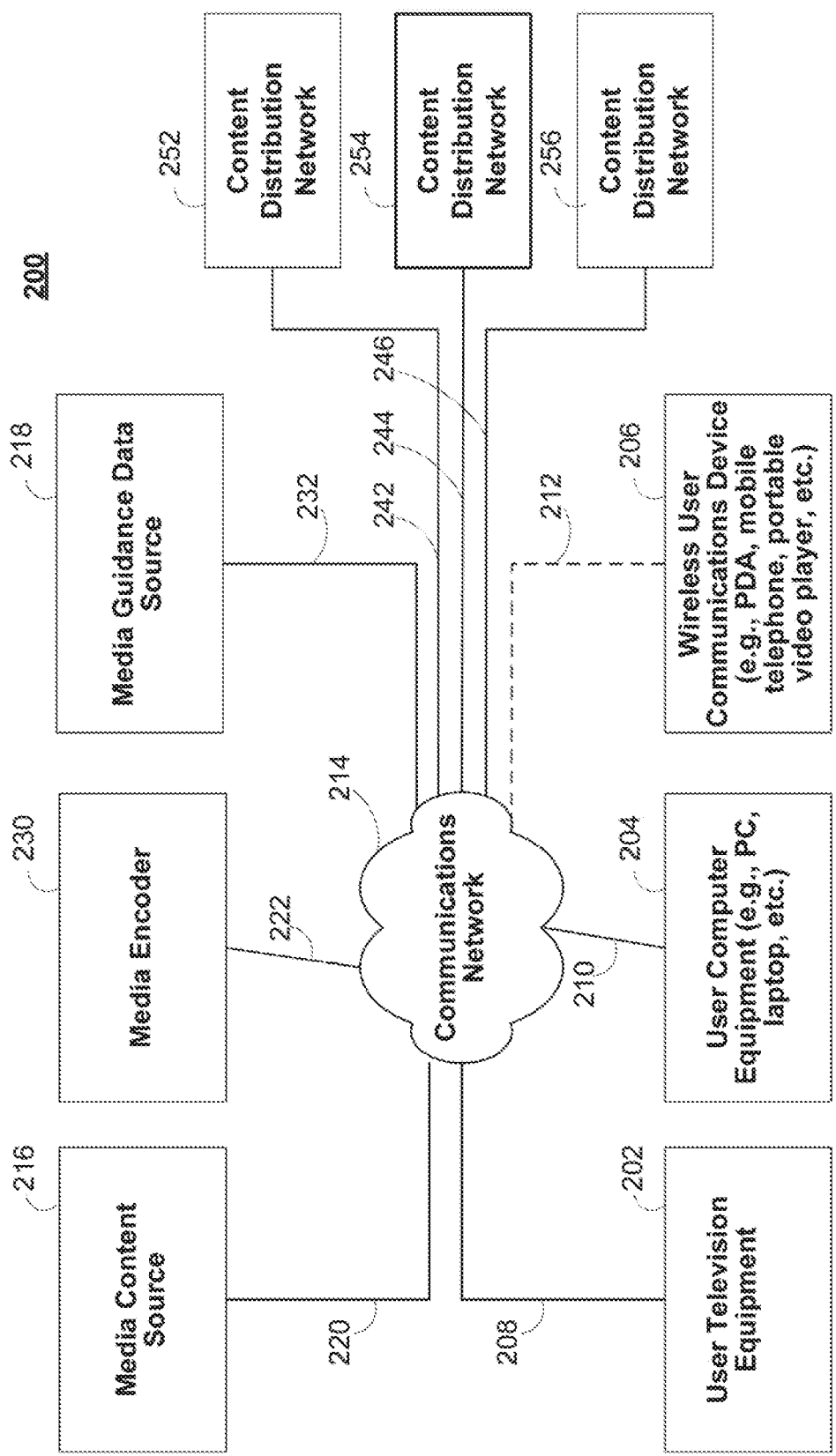
FIG. 2 shows an example of a block diagram of hardware that can be used in accordance with some embodiments of the invention.

Turning to FIG. 2, an example 200 of architecture of hardware that can be used in accordance with some embodiments is shown. As illustrated, architecture 200 can include a user television equipment device 202, a user computer equipment device 204, a wireless user communication device 206, a communications network 214, a media content source 216, a media guidance data source 218, a media encoder 230, content distribution networks (CDNs) 252, 254, and 256, and communication paths 208, 210, 212, 220, 222, 232, 242, 244, and 246, in some embodiments.

In some embodiments, user television equipment device 202, user computer equipment device 204, and wireless user communication device 206, which can each be referred to herein as a "user equipment device," can be any suitable devices for presenting media content, presenting an interactive media guidance application for selecting content, and/or performing any other suitable functions as described herein.

User television equipment device 202 can be any suitable user television equipment device or devices in some embodiments. For example, in some embodiments, user television equipment device 202 can include any suitable television, smart TV, set-top box, integrated receiver decoder (IRD) for handling satellite television, digital storage device, digital media receiver (DMR), digital media adapter (DMA), streaming media device, DVD player, DVD recorder, connected DVD, local media server, BLU-RAY player, BLU-RAY recorder, any other suitable user television equipment, and/or any other suitable combination of the same.

User computer equipment 204 can be any suitable user computer equipment in some embodiments. For example, in some embodiments, user computer equipment 204 can include any suitable personal computer (PC), laptop computer, tablet computer, WebTV box, personal computer television (PC/TV), PC media server, PC media center, hand-held computer, stationary telephone, non-portable gaming machine, any other suitable user computer equipment, and/or any other suitable combination of the same.

Wireless user communication device 206 can be any suitable wireless user communication device or devices in some embodiments. For example, in some embodiments, wireless user communication device 206 can include any suitable personal digital assistant (PDA), mobile telephone, portable video player, portable music player, portable gaming machine, smart phone, any other suitable wireless device, and/or any other suitable combination of the same.

In some embodiments, user equipment devices may be connectable to a communications network. For example, in some embodiments, user equipment devices may be Internet-enabled allowing them to access Internet media content.

In some embodiments, communications network 214 may be any one or more networks including the Internet, a mobile phone network, a mobile voice network, a mobile data network (e.g., a 3G, 4G, or LTE network), a cable network, a satellite network, a public switched telephone network, a local area network, a wide area network, a wireless network (e.g., WiFi, WiMax, etc.), any other suitable type of communications network, and/or any suitable combination of communications networks.

Media content source 216 may include one or more types of content distribution equipment for distributing any suitable media content, including television distribution facility equipment, cable system head-end equipment, satellite distribution facility equipment, programming source equipment (e.g., equipment of television broadcasters, such as NBC, ABC, HBO, etc.), intermediate distribution facility equipment, Internet provider equipment, on-demand media server equipment, live media distribution equipment, cameras, and/or any other suitable media content provider equipment, in some embodiments. NBC is a trademark owned by the National Broadcasting Company, Inc., ABC is a trademark owned by the American Broadcasting Companies, Inc., and HBO is a trademark owned by the Home Box Office, Inc.

Media content source 216 may be operated by the originator of content (e.g., a television broadcaster, a Webcast provider, etc.) or may be operated by a party other than the originator of content (e.g., an on-demand content provider, an Internet provider of content of broadcast programs for downloading, etc.), in some embodiments.

Media content source 216 may be operated by cable providers, satellite providers, on-demand providers, Internet providers, providers of over-the-top content, subscription providers, rental providers, and/or any other suitable provider(s) of content, in some embodiments.

Media content source 216 may include a remote media server used to store different types of content (including video content selected by a user), in a location remote from any of the user equipment devices, in some embodiments. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 218 may provide any suitable media guidance data, such as names of pieces of media content, times at which the media content is available (if applicable), sources (e.g., channels, Web addresses, etc.) from which the media content can be obtained, parental ratings for the pieces of media content, durations of the pieces of media content, descriptions of the pieces of media content, reviews or quality ratings of the pieces of media content, and/or any other suitable information, in some embodiments.

Media guidance data may be provided by media guidance data source 218 to the user equipment devices using any suitable approach, in some embodiments. In some embodiments, for example, an interactive media guidance application may be a stand-alone interactive television program guide that receives this media guidance data from media guidance data source 218 via a data feed (e.g., a continuous feed or trickle feed). In some embodiments, this media guidance data may be provided to the user equipment on a television channel sideband, using an in-band digital signal, using an out-of-band digital signal, or by any other suitable data transmission technique from media guidance data source 218. In some embodiments, this media guidance data may be provided to user equipment on multiple analog or digital television channels from media guidance data source 218. In some embodiments, media guidance data from media guidance data source 218 may be provided to users' equipment using a client-server approach, wherein media guidance data source 218 acts as a server.

In some embodiments, media guidance data source 218 may manage a pool of one or more content delivery networks (CDNs) that are used to deliver content to a plurality of user equipment devices. More particularly, in some embodiments, media guidance data source 218 may maintain a list of the CDNs from the pool and make changes to the list as CDNs are added or removed from the pool. When a CDN is added to the pool by media guidance source 218, or periodically, media guidance data source 218 may provide the list to media encoder 230.

In some embodiments, media guidance data source 218 may maintain records relating to the geographic distribution of user equipment devices that are currently streaming the content. For example, media guidance data source 218 may maintain a record that indicates a plurality of locations along with a count of user equipment devices located at each of the locations that are currently streaming the media content. In some embodiments, any one of the locations in the record may be indicated by: an identifier of a geographic location; an identifier of a network; an identifier of a network domain; an item of information that is found in a Domain Name Service (DNS) record; and/or any other suitable identifier.

Media encoder 230 may receive live content from media content source 216 and encode fragments of the content using a media encoding algorithm. Each fragment may be of any suitable duration, such as 2-10 seconds. In addition, each fragment may be encoded into one or more media files. In some embodiments, each fragment may be encoded into multiple media files that have different bit encoding rates.

Media encoder 230 may provide the media files corresponding to each fragment of the media content to each one of the pool of CDNs that are used to deliver the media content to user equipment devices. In some embodiments, media encoder 230 may identify the CDNs by obtaining the list maintained by media guidance data source 218. In some embodiments, the media files may be uploaded to the CDNs in the pool over a File Transfer Protocol (FTP) connection and/or any other suitable mechanism. Additionally or alternatively, in some embodiments, media encoder 230 may obtain a current copy of the list of CDNs before uploading media files that correspond to a fragment of the content. Doing so may cause any changes made to the pool of CDNs by media guidance data source 218 to take place immediately.

After the upload of a set of media files that correspond to a fragment of the media content is completed, media encoder 230 may provide a set of addresses to media guidance data source 218. Each address in the set may be the address of one of the media files at one of the CDN's in the pool. Each address in the set may be usable to retrieve a media file from the address' respective CDN. Addresses from the set may be later communicated by media guidance data source 218 to user equipment devices that seek to stream the media content. The user equipment devices may use these addresses to obtain the CDNs in the pool.

Content delivery network (CDN) 252 may distribute content to user equipment devices 202, 204, and/or 206. CDN 252 may include: load balancing servers; request servers; cache servers; storage servers; communications switches; gateways; and/or any other suitable equipment. In some embodiments, CDN 252 may include a cloud-based storage that includes virtualized pools of storage hosted in an Internet data center, such as the Amazon S3 storage provided by Amazon Web Services of Herndon, Va., USA. In some embodiments, the cloud based storage may be used to "locally" cache media content for presentation on user equipment devices 202, 204, and/or 206. Any suitable type and/or number of equipment may be used to implement CDN 252, in some embodiments.

CDN 252 may use an adaptive bit rate (ABR) technique in which content is encoded into fragments (e.g., 2-10 seconds in length) that have different bit encoding rates. Having fragments of different bit encoding rates permits CDN 252 to dynamically select the proper bit-rate for user equipment devices depending on the networking resources available to any of the devices. In live content streaming, the fragments may be provided to client devices in real-time or near-real time as they are generated. As noted above, the fragments may be obtained from media encoder 230.

CDN 254 and CDN 256 may have similar structures to CDN 252. Each CDN may include a different plurality of computing devices (e.g., load balancers, cache servers, or storage servers). Additionally or alternatively, each CDN may be implemented by using a different data center. In some embodiments, CDNs 252, 254, and 256 may have different geographic locations from one another.

In some embodiments, each of CDN 252, 254 and 256 may be operated by third-party operators that deliver content on behalf of the operators of media content source 216 and/or media guidance data source 218. Each CDN may be associated with a different price that the operator of the CDN charges for the delivery of the media content. The price may be structured in terms of: dollars per amount of data served; dollars per amount of bandwidth that is made available to serve the content; dollars per amount of bandwidth that is consumed; and/or in accordance with any other suitable pricing scheme.

Although only one each of user equipment devices 202, 204, and/or 206, sources 216 and 218, media encoder 230, and CDNs 252, 254, and 256 are illustrated in FIG. 2 in order to avoid over complicating the drawing, any suitable number of each of these components can be provided in some embodiments.

Each user may utilize more than one type of user equipment device in some embodiments. In some embodiments, any of user equipment devices 202, 204, and 206 can be combined, and any of media content source, media encoder 230, and media guidance data source 218 may be combined.

Paths 208, 210, 212, 220, 222, 232, 242, 244, and 246 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths, in some embodiments. Path 212 is drawn with dotted lines to indicate that, in the example embodiment shown in FIG. 2, it can be a wireless path (although this path may be a wired path, if desired), and paths 208, 210, 220, 222, and 232 are drawn as solid lines to indicate they can be wired paths (although these paths may be wireless paths, if desired). In some embodiments, communication to/from user equipment devices 202, 204, and 206, sources 216 and 218, media encoder 230, and CDNs 252, 254, and 256 may be provided by one or more of communications paths 208, 210, 212, 220, 222, and 232, respectively, but are shown as a single path in FIG. 2 to avoid overcomplicating the drawing.

Although direct communications paths are not drawn between user equipment devices 202, 204, and 206, and between sources 216 and 218, media encoder 230, and CDNs 252, 254, and 256, these components may communicate directly with each other via communication paths, such as those described above, as well via point-to-point communication paths, such as USB cables, IEEE 1394 cables, wireless paths (e.g., Bluetooth, infrared, IEEE 802.11x, etc.), or other communication via wired or wireless paths, in some embodiments. BLUETOOTH is a certification mark owned by Bluetooth SIG, INC. The user equipment devices 202, 204, and 206, sources 216 and 218, media encoder 230, and CDNs 252, 254, and 256 may also communicate with each other directly through an indirect path via communications network 214, in some embodiments.

In some embodiments, sources 216 and 218 and media encoder 230 can be implemented in any suitable hardware. For example, sources 216 and 218 and media encoder 230 can be implemented in any of a general purpose device such as a computer or a special purpose device such as a client, a server, a mobile terminal (e.g., a mobile phone), etc. Any of these general or special purpose devices can include any suitable components such as a hardware processor (which can be a microprocessor, a digital signal processor, a controller, etc.). Furthermore, as noted above, any of media encoder 230 and sources 218 and 216 may be integrated as a single device (e.g., a single computer) and/or a single distributed system.

Figure 3:
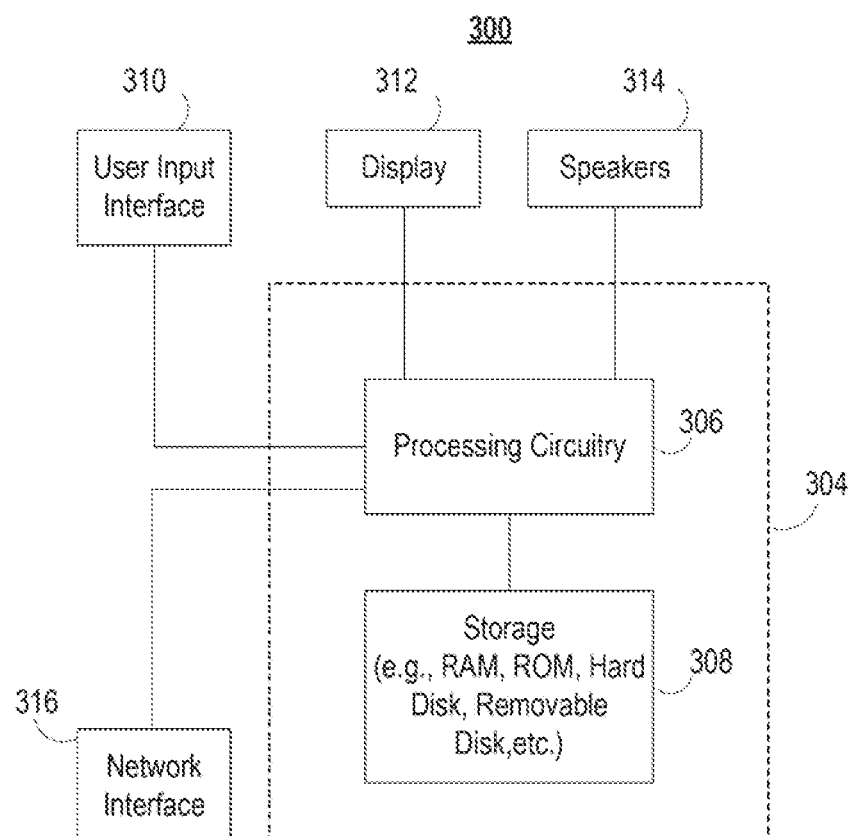
FIG. 3 shows an example of a block diagram of user equipment device hardware that can be used in accordance with some embodiments of the invention.

FIG. 3 shows an example of hardware that can be provided in an illustrative user equipment device 300, such as user television equipment device 202, user computer equipment device 204, and/or wireless user communication device 206 of FIG. 2, in accordance with some embodiments. As illustrated, device 300 can include control circuitry 304 (which can include processing circuitry 306 and storage 308), a user input interface 310, a display 312, speakers 314, and an input/output (hereinafter "I/O") interface 316, in some embodiments.

Control circuitry 304 may include any suitable processing circuitry such as processing circuitry 306. As referred to herein, processing circuitry 306 can be circuitry that includes one or more microprocessors, microcontrollers, digital signal processors, programmable logic devices, field-programmable gate arrays (FPGAs), application-specific integrated circuits (ASICs), hardware processors, etc., and may include a multi-core processor (e.g., dual-core, quad-core, hexa-core, or any suitable number of cores) or a supercomputer, in some embodiments. In some embodiments, processing circuitry may be distributed across multiple separate processors or processing units, such as, for example, multiple of the same type of processing units (e.g., two Intel Core i7 processors) or multiple different processors (e.g., an Intel Core i5 processor and an Intel Core i7 processor).

Storage 308 can be any suitable digital storage mechanism in some embodiments. For example, storage 308 can include any device for storing electronic data, program instructions, computer software, firmware, register values, etc., such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store media content, media guidance data, executable instructions (e.g., programs, software, scripts, etc.) for providing an interactive media guidance application, and for any other suitable functions, and/or any other suitable data or program code, in accordance with some embodiments. Nonvolatile memory may also be used (e.g., to launch a boot-up routine and other instructions), in some embodiments. Cloud-based storage may be used to supplement storage 308 or instead of storage 308 in some embodiments.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits, in some embodiments. Encoding circuitry (e.g., for converting over-the-air, analog, or digital signals to MPEG signals for storage) may also be provided, in some embodiments. Control circuitry 304 may also include scaler circuitry for upconverting and downconverting content into the preferred output format of the user equipment 300, in some embodiments. Circuitry 304 may also include digital-to-analog converter circuitry and analog-to-digital converter circuitry for converting between digital and analog signals. The video generating circuitry may be used for presenting media content, in some embodiments. The tuning and encoding circuitry may be used by the user equipment device to receive and to display, to play, or to record content, in some embodiments. The tuning and encoding circuitry may also be used to receive guidance data, in some embodiments. The circuitry described herein, including for example, the tuning, video generating, encoding, decoding, encrypting, decrypting, scaler, and analog/digital circuitry, may be implemented using software running on one or more general purpose or special purpose hardware processors, in some embodiments. Multiple tuners may be provided to handle simultaneous tuning functions (e.g., watch and record functions, picture-in-picture (PIP) functions, multiple-tuner recording, etc.), in some embodiments. If storage 308 is provided as a separate device from user equipment 300, the tuning and encoding circuitry (including multiple tuners) may be associated with storage 308, in some embodiments.

A user may send instructions to control circuitry 304 using user input interface 310, in some embodiments. User input interface 310 may be any suitable user interface, such as a remote control, mouse, trackball, keypad, keyboard, touch screen, touchpad, stylus input, joystick, voice recognition interface, or other user input interfaces, in some embodiments.

Display 312 may be provided as a stand-alone device or integrated with other elements of user equipment device 300, in some embodiments. Display 312 may be one or more of a monitor, a television, a liquid crystal display (LCD) for a mobile device, or any other suitable equipment for displaying visual images, in some embodiments. In some embodiments, display 312 may be HDTV-capable. In some embodiments, display 312 may be a 3D display.

A video card or graphics card may generate the output to display 312, in some embodiments. The video card may offer various functions such as accelerated rendering of 3D scenes and 2D graphics, MPEG-2/MPEG-4 decoding, TV output, or the ability to connect multiple monitors, in some embodiments. The video card may be any processing circuitry described above in relation to control circuitry 304, in some embodiments. The video card may be integrated with the control circuitry 304 or may be integrated with display 312, in some embodiments.

Speakers 314 may be provided as integrated with other elements of user equipment device 300 or may be stand-alone units, in some embodiments. The audio component of media content displayed on display 312 may be played through speakers 314, in some embodiments. In some embodiments, the audio may be distributed to a receiver (not shown), which processes and outputs the audio via speakers 314.

I/O interface 316 can be any suitable I/O interface 316 in some embodiments. For example, in some embodiments, I/O interface 316 can be any suitable interface for coupling control circuitry 304 (and specifically processing circuitry 306) to one or more communications paths (e.g., paths 208, 210, and 212 described in FIG. 2). More particularly, for example, I/O interface 316 can include a cable modem, an integrated services digital network (ISDN) modem, a digital subscriber line (DSL) modem, a telephone modem, an Ethernet card, a fiber-optic modem, a wireless modem, and/or any other suitable communications circuitry. In some embodiments, the I/O interface can be used to provide content and data from an external location to device 300. For example, in some embodiments, I/O interface 316 can be used to provide media content (e.g., broadcast programming, on-demand programming, Internet content, content available over a local area network (LAN) or wide area network (WAN), and/or any other suitable content), media guidance data, subtitles, time codes, and/or any other suitable information or data to control circuitry 304 of device 300. In some embodiments, I/O interface 316 can also be used to send and receive commands, requests, and other suitable data from and to, respectively, control circuitry 304. Any suitable number of I/O interfaces 316 can be provided, even though only one is shown in FIG. 3 to avoid overcomplicating the drawing.

The processes for playing back media content, the interactive media guidance application and/or any other suitable functions as described herein may be implemented as stand-alone applications on user equipment devices in some embodiments. For example, the processes for playing back media content and/or the interactive media guidance application may be implemented as software or a set of executable instructions which may be stored in storage 308, and executed by control circuitry 304 of a user equipment device 300.

In some embodiments, the processes for playing back media content, the interactive media guidance application, and/or any other suitable functions as described herein may be implemented as client-server applications. In such client-server applications, a client application may reside on a user equipment device, and a server application may reside on a remote server, such as source 216 or one of CDNs 252, 254, and 256. For example, the processes for playing back media content may be implemented partially as a client application on control circuitry 304 of user equipment device 300 and partially as a server application on media content source 216 or one of CDNs 252, 254, and 256. As another example, an interactive media guidance application may be implemented partially as a client application on control circuitry 304 of user equipment device 300 and partially on a remote server (e.g., media guidance data source 218 or one of CDNs 252, 254, and 256) as a server application running on control circuitry of the remote server.

Figure 4:
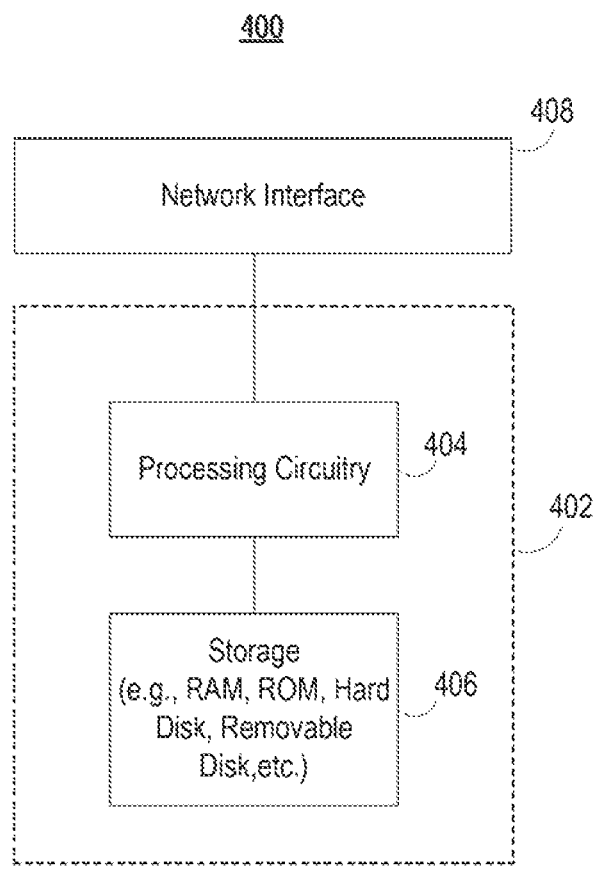
FIG. 4 shows an example of a block diagram of server hardware that can be used in accordance with some embodiments of the invention.

FIG. 4 shows an example of hardware that can be provided in an illustrative server 400. Server 400 may be part of a media guidance data source, such as media guidance data source 218, and it may implement a media content delivery process, such as at least portions of content delivery process 500, which is shown in FIG. 5. As illustrated, server 400 can include control circuitry 402 (which can include processing circuitry 404 and storage 406) and a network interface 408.

Control circuitry 402 may include any suitable processing circuitry such as processing circuitry 404. As referred to herein, processing circuitry 404 can be circuitry that includes one or more microprocessors, microcontrollers, digital signal processors, programmable logic devices, field-programmable gate arrays (FPGAs), application-specific integrated circuits (ASICs), hardware processors, etc., and may include a multi-core processor (e.g., dual-core, quad-core, hexa-core, or any suitable number of cores) or a supercomputer, in some embodiments. In some embodiments, processing circuitry may be distributed across multiple separate processors or processing units, such as, for example, multiple of the same type of processing units (e.g., two Intel Core i7 processors) or multiple different processors (e.g., an Intel Core i5 processor and an Intel Core i7 processor).

Storage 406 can be any suitable digital storage mechanism in some embodiments. For example, storage 406 can include any device for storing electronic data, program instructions, computer software, firmware, register values, etc., such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 406 may be used to store media content, media guidance data, executable instructions (e.g., programs, software, scripts, etc.) for providing an interactive media guidance application, and for any other suitable functions, and/or any other suitable data or program code, in accordance with some embodiments. Nonvolatile memory may also be used (e.g., to launch a boot-up routine and other instructions). Cloud-based storage may be used to supplement storage 406 or instead of storage 406 in some embodiments.

Control circuitry 402 may include encoding circuitry for encoding media content (e.g., video or audio). Control circuitry 402 may also include adaptive bit streaming circuitry for encoding the media content into multiple bit rates and performing switches between the streams during normal playback based upon the streaming conditions. Control circuitry 402 may also include streaming circuitry for transmitting the different bit streams via network interface 408.

For example, in some embodiments, interface 408 can be any suitable interface for coupling control circuitry 402 (and specifically processing circuitry 404) to one or more communications networks. More particularly, for example, interface 408 can include a cable modem, an integrated services digital network (ISDN) modem, a digital subscriber line (DSL) modem, a telephone modem, an Ethernet card, a fiber-optic modem, a wireless modem, and/or any other suitable communications circuitry. In some embodiments, the I/O interface can be used by server 400 to stream content to a client device, such as device 300. More particularly, in some embodiments, interface 408 can be used to provide media content (e.g., broadcast programming, on-demand programming, Internet content, content available over a local area network (LAN) or wide area network (WAN), and/or any other suitable content). In some embodiments, interface 408 can also be used to receive commands, requests, from a client device. Such requests may be for blocks (e.g., chunks) of media content that is being streamed.

Figure 5A:
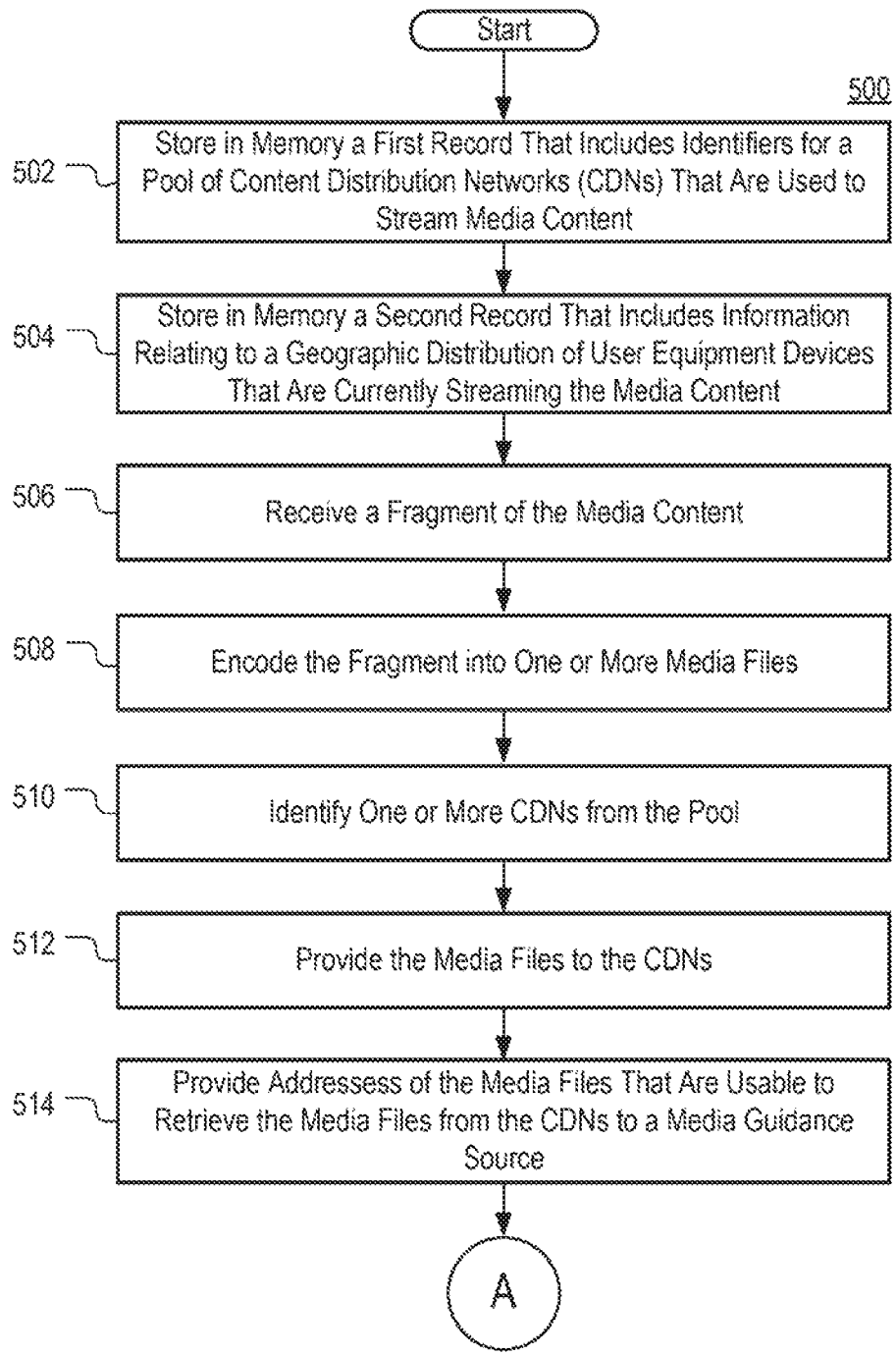
FIGS. 5A and 5B show an example of a flow diagram of a process for delivery of content, in accordance with some embodiments of the invention.
Figure 5B:
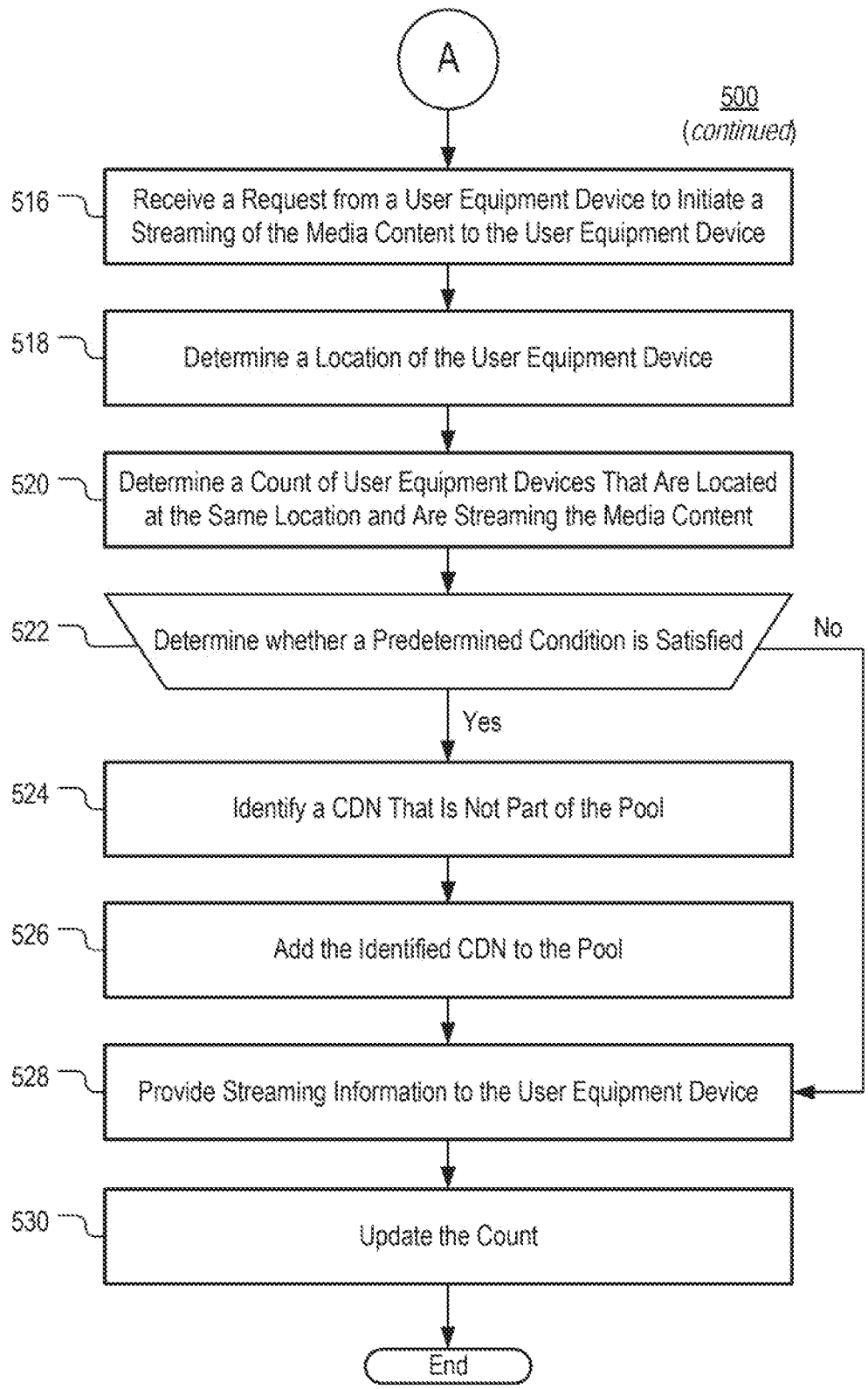

FIGS. 5A and 5B depict a flowchart of an example of a process 500 for distributing media content in accordance with some embodiments of the disclosed subject matter.

At 502, one or more first records may be stored in memory or any other suitable location. The one or more first records may include identifiers for a pool of one or more content delivery networks (CDNs) that can be used to stream media content to a plurality of user equipment devices. Any suitable type of identifiers may be used in the first record(s) in some embodiments. For example, in some embodiments, an identifier of a CDN in the pool may include an identifier for a component of the CDN, such as a gateway or a load balancer. Step 502 may be performed by: a media guidance data source, such as media guidance data source 218; processing circuitry of the media guidance data source; and/or any other suitable device or processing circuitry thereof.

At 504, one or more second records may be stored in memory or any other suitable location. The second record(s) may include information relating to the geographic distribution of user equipment devices that are currently streaming media content from CDNs in the pool. In some embodiments, the record(s) may identify a set of one or more locations. In some embodiments, for each location, the record may identify a count of user equipment devices that are located at that location and are currently streaming the media content. The count may be a string, a number, or an alphanumerical string that is based on (or indicative of) a number of user equipment devices that are streaming the media content.

In some embodiments, two or more user equipment devices may be considered to be at the same location when the user equipment devices are located in the same region as each other (e.g., in the same district, in the same service area, in the same telephone service area, in the same city, or in the same state, etc.). Any suitable definition of location may be used, in some embodiments.

Additionally or alternatively, in some embodiments, two or more user equipment devices may be considered to be at the same location when the user equipment devices are part of the same network domain (or the same network; or the same portion of a network) as each other. Additionally or alternatively, in some embodiments, two user equipment devices may be considered to be at the same location when one of the user equipment devices is part of a network domain (or a network; or a portion of a network) that is associated with a network domain (or a network; or a portion of a network) the other user equipment device is part of. Thus, in some embodiments, whether two user equipment devices are located at the same location may, at least in part, depend on the topology of network(s) the two user equipment devices are part of.

Additionally or alternatively, in some embodiments, a two user equipment devices may be considered to be at the same location when a first record corresponding to one of the user equipment devices contains an item of information (e.g., a number, a word, or an alphanumerical string) that satisfies a similarity criterion with respect to another item of information that is part of a second record that corresponds to the other user equipment device. Any suitable type of records may be used, in some embodiments. For example, the first record and the second record may be Domain Name Service (DNS) records, records maintained by Internet service providers, records maintained by network administrators, records maintained by content distributors, and/or any other suitable records.

To determine whether two or more user equipment devices are at the same location, any suitable similarity criterion may be used in some embodiments. For example, in some embodiments, the similarity criterion may be one that is satisfied when the two items of information are identical. As another example, in some embodiments, the similarity criterion may be one that is satisfied when the first item of information and the second item of information are within a predetermined distance from one another in the space of items of information from their type.

Step 504 may be performed by: a media guidance data source, such as media guidance data source 218; processing circuitry of the media guidance source and/or any other suitable device or processing circuitry thereof.

At 506, a fragment of the media content may be received. The fragment may be received in any suitable manner, in some embodiments. The fragment may include any suitable media content, such as media content data that is sufficient to render (e.g., in sound and/or in image) at least a portion of the media content (e.g., 2-10 seconds of the media content).

At 508, the fragment of the media content may be encoded to generate one or more media files that encode the fragment. The fragment may be encoded in any suitable manner, in some embodiments. For example, in some embodiments, one or more of the files may have a different encoding bit rate.

At 510, one or more CDNs in the pool may be identified. The one or more of the CDNs may be identified in any suitable manner, in some embodiments. For example, in some embodiments, a first record may be obtained and used to identify the CDNs.

At 512, at least some of the generated media files may be provided to the identified CDNs. The media files may be provided in any suitable manner, in some embodiments. For example, in some embodiments, at least some of the generated media files may be uploaded via a File Transfer Protocol (FTP) connection to each of the CDNs. Upon uploading any one of the media files to a given CDN, the address (e.g., Uniform Resource Locator (URL)) of that file at the CDN may be recorded. In some embodiments, the addresses (of some or all) of the media files at different CDNs may be recorded. These addresses, as is further discussed below, may be usable by user equipment devices to obtain the media files when the content is being streamed.

At 514, the addresses of the media files may be provided to media guidance data source, such as media guidance data source 218. The addresses may be provided in any suitable manner, in some embodiments.

Each of steps 506-514 may be performed by: an encoder, such as media encoder 230; and/or any other suitable device.

At 516, a request may be received from a user equipment device to initiate a streaming of the content to the user equipment device. The request may be received in any suitable manner in some embodiments. For example, in some embodiments, the request may be transmitted over a communications network, such as network 214. In some embodiments, the request may be received at a media guidance data source, such as media guidance data source 218.

At 518, the location of the user equipment device may be determined. The device may be determined in any suitable manner, in some embodiments. For example, in some embodiments, determining the location, in some embodiments, may include obtaining an identifier that is indicative of the user equipment device's physical location, such as: an identifier of a network domain (or portion thereof) the device is part of; an identifier of a network (or portion thereof) the device is part of; coordinates of the device (e.g., by using a Global Positioning System (GPS) capability that is built into the device); and/or any other suitable identifier. Additionally or alternatively, in some embodiments, the location of the user equipment device may be determined by using an instance of the nslookup utility. Additionally or alternatively, in some embodiments, determining the location of the user equipment device may include retrieving a record (e.g., a DNS record, a record maintained by an Internet Service provider, and/or any other suitable type of record) that corresponds to the user equipment device and obtaining an item of information that is part of the retrieved record that is indicative of the location of the user equipment device. Any suitable item of information may be used in some embodiments. For example, in some embodiments, the item of information may include: an item of information that is indicative of a network domain (or portion thereof); an item of information that is indicative of a network (or portion thereof); an item of information that is indicative of a city; an item of information that is indicative of a physical address; an item of information that is indicative of a network address; and/or any other suitable item.

At 520, a count of user equipment devices that are located at the same location as the user equipment device and are streaming the media content may be determined. This count may be determined in any suitable manner, in some embodiments. For example, in some embodiments, one of the first records may be obtained and used to identify the count. Additionally or alternatively, in some embodiments, the count may be determined based on responses to queries transmitted over a communications network to one or more devices/systems that are responsible for routing user equipment devices to CDNs (e.g., in the same manner as the device/system executing steps 516-530) and receiving respective counts of user equipment devices at the location that are currently streaming the media content and have been assisted in streaming the media content by each of the CDNs.

At 522, a determination may be made whether a predetermined condition is satisfied. Any suitable predetermined condition may be used, in some embodiments. For example, in some embodiments, the predetermined condition may be based on the count. For example, the predetermined condition may be one that is satisfied when the count meets (e.g., exceeds, equals, or falls below) a predetermined threshold.

Additionally or alternatively, in some embodiments, the predetermined condition may be based on a value of a quality of service metric of a communications path connecting a CDN that is used to provide media content with a user equipment device that is streaming the content. Any suitable quality of service metric may be used. For example, the quality of service metric may be latency, bandwidth, jitter, and/or any other suitable quality of service metric. Thus, in some embodiments, the predetermined criterion may be a criterion that is satisfied when the quality of service metric meets a predetermined threshold.

Additionally or alternatively, in some embodiments, the predetermined condition may be based on a plurality of quality of service metric values, wherein each quality of service value is for a different one of a plurality of communications paths. Each communications path may be one that connects a CDN that is used to provide the media content with user equipment. Each communication path may be one that is leading to different one of a plurality of user equipment devices that are streaming the content. In some embodiments, the predetermined condition may be based on an average, median, and/or any other suitable statistical characteristic of the plurality of quality of service metric values.

When the predetermined condition is determined to be satisfied, the execution of process 500 proceeds to step 524. Otherwise, when the predetermined condition is found to not be satisfied, the execution of process 500 proceeds to step 528.

At 524, an additional CDN that is available to stream the media content may be identified. This identification may be performed in any suitable manner, and any suitable CDN may be identified, in some embodiments. The additional CDN, in some embodiments, may include a plurality of computing devices (e.g., servers, load balancers, cache servers, and/or any suitable type of computing device). In some embodiments, the additional CDN may be implemented using a data center that is different from the data centers used to implement the CDNs in the pool. For example, the data center of the additional CDN may be at a different geographic location than the data centers of the other CDNs in the pool.

In some embodiments, the additional CDN may be selected from a plurality of available CDNs. Additionally or alternatively, the CDN may be selected based on a predetermined criterion. Any suitable criterion may be used, in some embodiments. For example, in some embodiments, the CDN may be selected based on a geographic location corresponding to the CDN (e.g., a geographic location where a data center that is used to implement the CDN is located).

As another example, in some embodiments, the CDN may be selected from the plurality of available CDNs based on a QoS metric associated with the CDN, such as latency or bandwidth. For example, in some embodiments, the QoS metric associated with the CDN may indicate one of the latency, bandwidth, or throughput for one or more communications paths between a component of the CDN (e.g., a load balancer) and a device located at a predetermined location, such as the location determined at step 518 and/or any other suitable location.

As yet another example, in some embodiments, the CDN may be selected from the plurality of available CDNs based on a price associated with the CDN (e.g., a price for a unit of bandwidth that is made available for serving the media content or price for a unit of bandwidth that is consumed by streaming the media content, a price for a unit of data served, etc.). For example, the CDN may be selected based on having the lowest associated price.

As yet another example, in some embodiments, the CDN may be selected from the plurality of available CDNs based on distance from CDNs in the pool. For example, the CDN may be selected based on being situated the furthest, of all CDNs in the plurality, from a given CDN in the pool. The distance between different CDNs may be based on the physical distance, the logical distance, and/or the network distance between the locations of data centers that are used to implement the CDNs.

In some embodiments, the additional CDN may be implemented using a different data center than data centers used to implement CDNs in the pool. In some embodiments, the additional CDN may include a plurality of computing devices (e.g., load balancers, cache servers, storage servers, etc.).

At 526, the CDN identified at step 524 may be added to the pool of CDNs that are responsible for streaming the media content. The CDN may be added in any suitable manner, in some embodiments. For example, in some embodiments, adding the CDN to the pool may include adding an identifier for the CDN to one or more of the first records. Additionally or alternatively, in some embodiments, adding the identified CDN to the pool may include configuring an encoder, such as media encoder 230, to start uploading media files corresponding to fragments of the media content to the CDN. Additionally or alternatively, configuring the encoder may include providing (e.g., transmitting over a communications network) an identifier for the CDN to the encoder.

At 528, the user equipment device may be provided with information that may be usable by the user equipment device to begin streaming media content. Any suitable information may be provided, and this information may be provided in any suitable manner, in some embodiments. For example, the information may include an address (e.g., a URL) that is usable to retrieve a media file from a CDN from the pool. The media file may be one that corresponds to a fragment of a media stream and is uploaded to the CDN by an encoder, such media encoder 230, in some embodiments. In some embodiments, in instances where the count is determined to meet the threshold at 522, the address may point to an instance of the media file that is stored at the CDN identified at step 524. The user equipment device may then use the streaming information to stream the media content from of the CDNs in the pool.

At 530, the record indicating the geographic distribution of the user equipment devices may be updated. This record may be updated in any suitable manner, in some embodiments. For example, in some embodiments, the count determined at step 520 may be incremented by one (or otherwise changed) in order to reflect that the user equipment device has begun streaming the media content based on the streaming information provided at step 528, in some embodiments.

Any of steps 516-530 may be performed by: a media guidance data source, such as media guidance data source 218; processing circuitry of the media guidance data source; and/or any other suitable device or processing circuitry thereof.

In some embodiments, a functional separation may be maintained between. As noted above, steps 506-514 may be performed by one or more media encoders, whereas steps 516-530 may be performed by a media guidance data source. Thus in some embodiments, failsafe mechanism (for adding CDN's to the pools e.g., the determination whether the predetermined condition is satisfied) may be implemented at a device that is separate from any media encoders.

Although in the above example a CDN is added to a pool CDNs that are responsible for streaming the media content, in other examples, when the count meets the threshold, a server may be added to a pool of servers that are used to stream the content, in some embodiments. For example, once added, that server may begin to receive streaming resources associated with the pool as discussed with respect to step 528. The address of that server may be provided to user equipment devices that seek to begin streaming the media content and the server may begin providing the media content to any devices that establish a connection with the server, in some embodiments.

It should be noted, however, that in some embodiments, adding a server to a pool of servers may be different from adding a CDN to a pool. In some embodiments, adding a new CDN to a pool of CDN may involve utilizing another data center to distribute the media content along with underlying data center infrastructure, such as load balancers and caching servers. The data center may be at a different location than other data centers in the pool and, thus, adding the CDN to the pool may provide user equipment devices located at the first location with additional network paths to stream the media content over. This in turn may prevent congestion of network paths spanning between the first location and other CDNs in the pool.

The above steps of the flow diagrams of FIGS. 5A-B may be executed or performed in any order or sequence not limited to the order and sequence shown and described in the figures. Some of the above steps of the flow diagrams of FIGS. 5A-B may be executed or performed substantially simultaneously where appropriate or in parallel to reduce latency and processing times. Some of the above steps of the flow diagrams of FIGS. 5A-B may be omitted. Although the above embodiments of the invention are described in reference to live content streaming, the techniques disclosed herein may be used in any type of data downloading, including non-live streaming of media content.

In some embodiments, any suitable computer readable media can be used for storing instructions for performing the mechanisms and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The above described embodiments of the present disclosure are presented for purposes of illustration and not of limitation, and the present disclosure is limited only by the claims which follow.

What is claimed is:

1. A system for live streaming content, the system comprising:
   an architecture comprising a hardware media encoder, a media content source, a hardware media server, and a plurality of user equipment devices connected via a communications network;
   wherein the media content source is configured to store different types of content in a location remote from any of the plurality of user equipment devices, wherein the plurality of user equipment devices comprises at least one or more of a personal computer, a tablet computer, a mobile telephone, or a portable media player;
   wherein the hardware media encoder is configured for real-time encoding and uploading a live content stream of a live event to a pool of content delivery networks for use in distributing the live content stream to the plurality of user equipment devices, wherein the pool of content delivery networks utilizes communication paths to stream the live content stream to the plurality of user equipment devices;
   the hardware media server is configured to:
      maintain the pool of content delivery networks for use in distributing the live content stream, wherein each content delivery network of the pool of content delivery networks comprises load balancing servers, gateways, and storage servers connected via the communications network;
      receive a request to stream the live content stream from a particular user equipment device of the plurality of user equipment devices, wherein the particular user equipment device has a first geographic location that is shared with the plurality of user equipment devices;
      provide a listing of content delivery networks of the pool of content delivery networks to the hardware media encoder, wherein the hardware media encoder encodes and uploads a first fragment of the live content stream to the pool of content delivery networks;
      provide, to the particular user equipment device, a manifest that identifies the pool of content delivery networks, wherein the particular user equipment device requests at least a portion of the live content stream from a first content delivery network from the pool of content delivery networks over a first distribution path;
      determine whether a predetermined condition is satisfied, wherein the predetermined condition comprises whether a count of user equipment devices that are located at the first geographic location and are currently streaming the live content stream from the pool of content delivery networks exceeds a threshold quantity of streaming user equipment devices;
      when the predetermined condition is satisfied:
         select an additional content delivery network from a set of available content delivery networks to add to the pool of content delivery networks based on a plurality of factors comprising at least:
            distance between a second geographic location corresponding to the additional content delivery network and geographic locations corresponding to content delivery networks within the pool of content delivery networks,
            latency along at least one different distribution path between the additional content delivery network and the particular user equipment device, and
            throughput for at least one different distribution path between the additional content delivery network and the particular user equipment device;
         update the pool of content delivery networks to include the additional content delivery network, wherein the additional content delivery network comprises a load balancing server, a gateway, and a storage server connected via a communications network;
         provide an updated listing of the updated pool of content delivery networks to the hardware media encoder, wherein the hardware media encoder encodes and uploads a second fragment of the live content stream to the updated pool of content delivery networks to stream the live content stream using a distribution path including the additional content delivery network from the updated pool of content delivery networks; and
         provide, to the particular user equipment device, an updated manifest that identifies the additional content delivery network, wherein the particular user equipment requests at least a portion of the live content stream from the additional content delivery network.

2. The system of claim 1, wherein the additional content delivery network includes a first plurality of computing devices that are part of a first data center, wherein
   the pool of content delivery networks includes a second plurality of computing devices that are part of a second data center; and
   the second data center is different from the first data center.

3. The system of claim 1, wherein updating the pool of content delivery networks to include the additional content delivery network further comprises providing the hardware media encoder with an identifier of the selected additional content delivery network, wherein the identifier identifies at least one of a gateway and a load balancer for the additional content delivery network.

4. The system of claim 1, wherein the hardware media server is further configured to maintain records relating to the geographic distribution of user equipment devices that are currently streaming the live content stream.

5. The system of claim 1, wherein the predetermined condition further includes a quality of service metric corresponding to the additional content delivery network.

6. The system of claim 1, wherein the plurality of factors further includes a price per unit of bandwidth associated with the additional content delivery network.

7. A method for live streaming content, comprising:
maintaining a pool of content delivery networks for use in distributing a live content stream, wherein each content delivery network of the pool of content delivery networks comprises load balancing servers, gateways, and storage servers connected via the communications network;
encoding and uploading a first fragment of a live content stream of a live event in real-time to the pool of content delivery networks for use in distributing the live content stream in real-time to a plurality of user equipment devices, wherein the pool of content delivery networks utilizes communication paths to stream the live content stream to user equipment devices;
receiving a request to stream the live content stream from a particular user equipment device, wherein the particular user equipment device has a first geographic location that is shared with a plurality of user equipment devices;
providing to the particular user equipment device, a manifest that identifies the pool of content delivery networks that contains at least a portion of the live content stream:
streaming content to the particular user equipment device using a first content delivery network from the pool of content delivery networks over a first distribution path;
determining whether a predetermined condition is satisfied, wherein the predetermined condition comprises whether a count of user equipment devices that are located at a first geographic location and are currently streaming the live content stream from the pool of content delivery networks exceeds a threshold quantity of streaming user equipment devices;
when the predetermined condition is satisfied:
selecting an additional content delivery network from a set of available content delivery networks to add to the pool of content delivery networks based on a plurality of factors comprising at least:
distance between a second geographic location corresponding to the additional content delivery network and geographic locations corresponding to content delivery networks within the pool of content delivery networks,
latency along at least one different distribution path between the additional content delivery network and the particular user equipment device, and
throughput for at least one different distribution path between the additional content delivery network and the particular user equipment device;
updating the pool of content delivery networks to include the additional content delivery network, wherein the additional content delivery network comprises a load balancing server, a gateway, and a storage server connected via a communications network;
providing a listing of the updated pool of content delivery networks to a hardware media encoder, wherein the hardware media encoder encodes and uploads a second fragment of the live content stream in real-time to the updated pool of content delivery networks to stream the live content stream using a distribution path including the additional content delivery network from the updated pool of content delivery networks; and
providing, to the particular user equipment device, an updated manifest that identifies the additional content delivery network, wherein the particular user equipment requests at least a portion of the live content stream from the additional content delivery network.

8. The method of claim 7, wherein the additional content delivery network includes a first plurality of computing devices that are part of a first data center
the pool of content delivery networks includes a second plurality of computing devices that are part of a second data center; and
the second data center is different from the first data center.

9. The method of claim 7, wherein updating the pool of content delivery networks to include the additional content delivery network further comprises providing the hardware media encoder with an identifier of the selected additional content delivery network, wherein the identifier identifies at least one of a gateway and a load balancer for the additional content delivery network, and wherein the hardware media encoder being configured to encode the content to produce encoded content and disseminate the encoded content among content delivery networks in the updated pool of content delivery networks.

10. The method of claim 7, further comprising maintaining records relating to the geographic distribution of user equipment devices that are currently streaming the live content stream.

11. The method of claim 7, wherein the plurality of factors further includes a quality of service metric corresponding to the first content delivery network.

12. The method of claim 7, wherein the plurality of factors further includes on a price per unit of bandwidth associated with the additional content delivery network.

13. A non-transitory computer-readable medium comprising instructions which, when executed by a computer, cause the computer to:
maintain a pool of content delivery networks for use in distributing a live content stream, wherein each content delivery network of the pool of content delivery networks comprises load balancing servers, gateways, and storage servers connected via the communications network;
encode and upload a first fragment of a live content stream of a live event in real-time to content delivery networks for use in distributing the live content stream to a plurality of user equipment devices, wherein the pool of content delivery networks utilizes communication paths to stream the live content stream to user equipment devices;
receive a request to stream the live content stream from a particular user equipment device, wherein the particular user equipment device has a first geographic location that is shared with a plurality of user equipment devices;
provide to the particular user equipment device, a manifest that identifies the pool of content delivery networks that contains at least a portion of the live content stream;
stream content to the particular user equipment device using a first content delivery network from the pool of content delivery networks over a first distribution path;
determine whether a predetermined condition is satisfied, wherein the predetermined condition comprises whether a count of user equipment devices that are located at a first geographic location and are currently streaming the live content stream from the pool of content delivery networks exceeds a threshold quantity of streaming user equipment devices;

when the predetermined condition is satisfied:
  select an additional content delivery network from a set of available content delivery networks to add to the pool of content delivery networks based on a plurality of factors comprising at least:
    distance between a second geographic location corresponding to the additional content delivery network and geographic locations corresponding to content delivery networks within the pool of content delivery networks,
    latency along at least one different distribution path between the additional content delivery network and the particular user equipment device, and
    throughput for at least one different distribution path between the additional content delivery network and the particular user equipment device;
  update the pool of content delivery networks to include the additional content delivery network, wherein the additional content delivery network comprises a load balancing server, a gateway, and a storage server connected via a communications network;
  provide a listing of the updated pool of content delivery networks to a hardware media encoder, wherein the hardware media encoder encodes and uploads a second fragment of the live content stream in real-time to the updated pool of content delivery networks to stream the live content stream using a distribution path including the additional content delivery network from the updated pool of content delivery networks; and
  provide, to the particular user equipment device, an updated manifest that identifies the additional content delivery network, wherein the particular user equipment requests at least a portion of the live content stream from the additional content delivery network.

14. The non-transitory computer-readable medium of claim 13, wherein
  the additional content delivery network includes a first plurality of computing devices that are part of a first data center;
  the pool of content delivery networks includes a second plurality of computing devices that are part of a second data center; and
  the second data center is different from the first data center.

15. The non-transitory computer-readable medium of claim 13, wherein updating the pool of content delivery networks to include the additional content delivery network further comprises providing the hardware media encoder with an identifier of the selected additional content delivery network, wherein the identifier identifies at least one of a gateway and a load balancer for the additional content delivery network, and wherein the hardware media encoder being configured to encode the content to produce encoded content and disseminate the encoded content among content delivery networks in the updated pool of content delivery networks.

16. The non-transitory computer-readable medium of claim 13, further comprising instructions to maintain records relating to the geographic distribution of user equipment devices that are currently streaming the live content stream.

17. The non-transitory computer-readable medium of claim 13, wherein the plurality of factors further includes a quality of service metric corresponding to the first content delivery network.

* * * * *